Nov. 16, 1965 F. GOATCHER 3,218,464

APPARATUS FOR HANDLING DATA IN PULSE CODE FORM USING MAGNETIC CORES

Filed April 25, 1958 2 Sheets-Sheet 1

Inventor
F. Goatcher
By Glascock Downing & Seebold
Attys

Inventor
F. Goatcher
By Glascock Downing & Seebold
Attys.

3,218,464
Patented Nov. 16, 1965

3,218,464

APPARATUS FOR HANDLING DATA IN PULSE CODE FORM USING MAGNETIC CORES

Frank Goatcher, Ashford, England, assignor to Electric & Musical Industries Limited, Hayes, England, a company of Great Britain Filed Apr. 25, 1958, Ser. No. 730,968
Claims priority, application Great Britain, Apr. 30, 1957, 13,796/57
6 Claims. (Cl. 307—88)

This invention relates to arithmetic devices such as are used in data handling apparatus and relates especially though not exclusively to binary adding devices, counting devices and the like.

Arithmetic devices find many applications in data handling apparatus and it is clearly desirable that such devices should be reliable and economical of components and also that one arrangement of components can be used as a basic unit for a variety of different functions.

The object of the present invention is to provide a novel arithmetic device with a view to achieving these desirable features.

According to the present invention there is provided an arithmetic device comprising first and second two state devices, means for applying an operative signal to said device tending to switch said first device from a second state to a first state and tending to switch said second device from a first state to a second state, means responsive to said first device in its first state to enable an operative signal to switch said second device to its second state and responsive to said first device in its second state to disable an operative signal from switching said second device to its second state, and means depending upon the states of said devices to tend to interchange said states.

Figure 1:
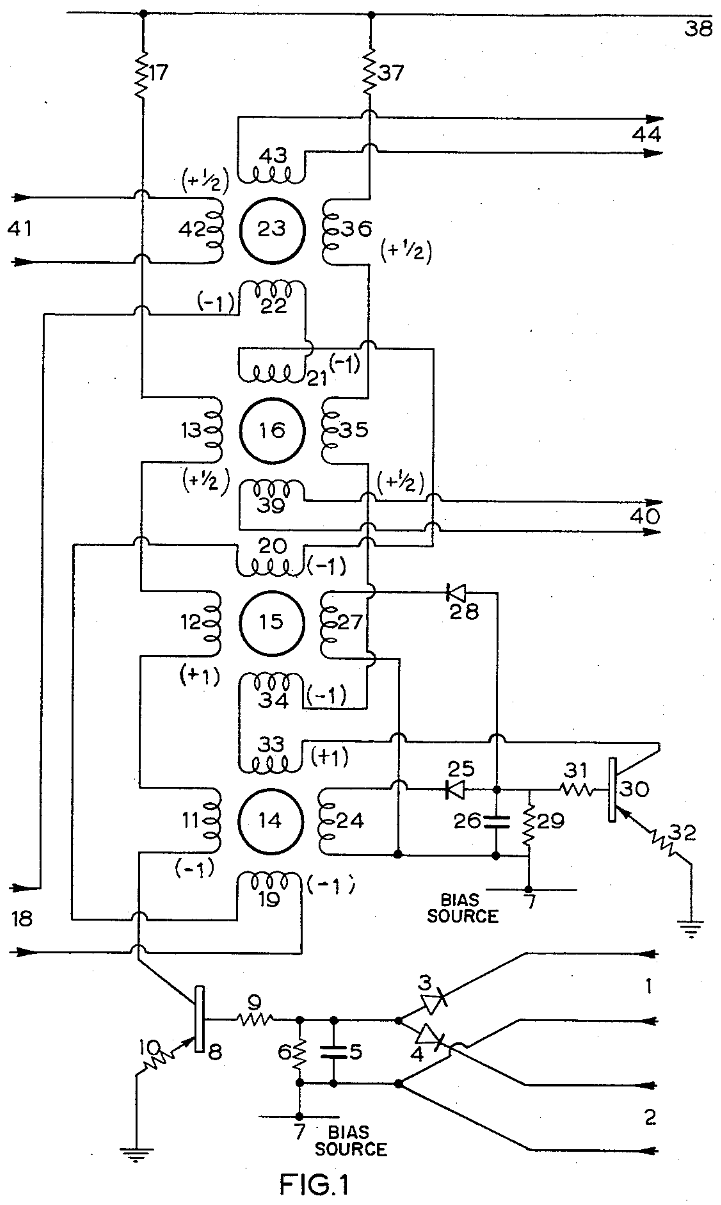
Figure 2:
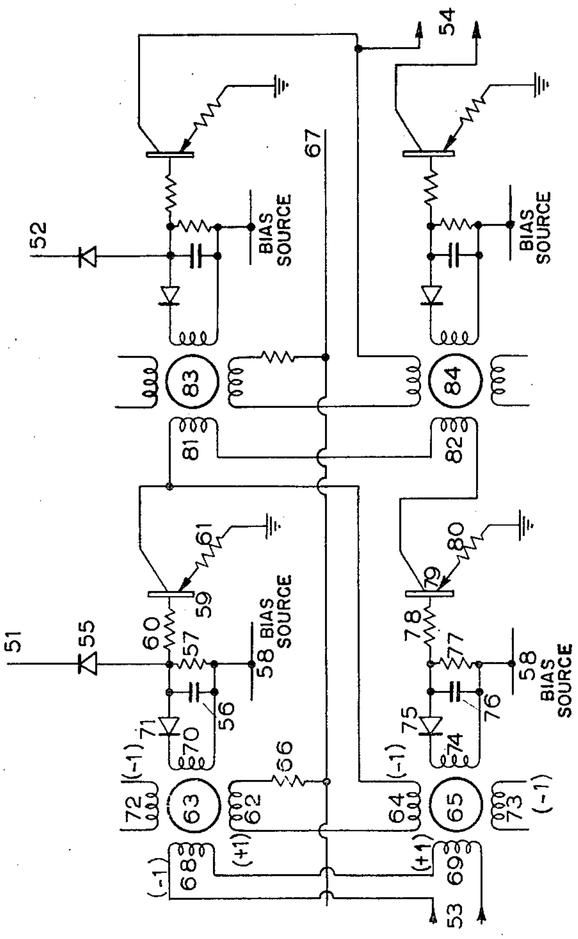

In order that the present invention may be clearly understood and readily carried into effect, the invention will be described with reference to the accompanying drawings in which:

FIGURE 1 illustrates an adding device according to one embodiment of the present invention, and FIGURE 2 illustrates a counting device according to another embodiment of the present invention.

Referring to FIGURE 1, input pulses from either of sources 1 or 2 are applied via diodes 3 and 4 respectively, to charge condenser 5. The condenser 5 is shunted by a resistor 6. The lower end of the condenser 5 is connected to a bias source 7 for the transistor 8. The potential of the upper end of the condenser 5 is applied via resistors 9 and 10 across the emitter-base path of the transistor 8. The output current of the transistor 8 flows through the winding 11, 12 and 13 associated with the cores 14, 15 and 16, respectively, and the resistor 17 which determines the current flowing. A winding which has sufficient turns of such senses that, when energised in normal operation of the circuit, it is capable of driving the core from a first remanent state to a second and opposite remanent state is termed a "+1" winding. A winding which is only capable of driving the respective core just over half way from said first to said second remanent state is termed as "+½" winding. Conversely, a winding which is capable of driving the respective core from the second remanent state to the first is termed a "—1" winding, and one capable of providing just over half this drive is termed a "—½" winding. Where appropriate the magnitude and sense of the various windings is denoted in the drawing by this notation. Shift pulses from source 18 are applied via windings 19, 20, 21 and 22 to cores 14, 15 and 16 and 23 respectively to drive the cores to a first remanent state. The winding 19 to 22 are all denoted as "—1" windings, but the pulses applied from the source 18 are of such large amplitude that they can overcome the effect of any other winding in the respective cores which is simultaneously energised so that a shift always at least temporarily restores a core in the second remanent state to the first. Each shift pulse may be said therefore to pre-switch any of the cores which is in its second state to its first state before any other pulse applied to the respective cores can take effect. Winding 24 gives output pulses when the core 14 changes its remanent state from the second state to said first state. These output pulses pass through the diode 25 to charge the condenser 26. Similarly pulses from the winding 27 charge the condenser 26 via the diode 28 in response to changes of remanent state of core 15. The condenser 26 is shunted by resistor 29 and their lower ends are connected to the source of bias 7 for the transistor 30. The potential at the upper end of the condenser 26 is applied via resistors 31 and 32 across the emitter-base circuit of the transistor 30. The output current of the transistor 30 flows through windings 33, 34, 35 and 36 which are associated with the cores 14, 15, 16 and 23 respectively, and the resistor 37 which determines the current flowing. The winding 34 is connected in negative sense with respect to the windings 33, 35 and 36, and the windings 35 and 36 are "+½" windings. The upper ends of resistors 17 and 37 are connected to a source 38 of polarising voltage for the transistors 8 and 30. Changes of state of the core 16 induce output pulses in the winding 39 which are fed to subsequent apparatus 40. "Take out selector" pulses from source 41 are applied to the "half" winding 42 associated with the core 23. Changes in the remanent state of core 23 induce output pulses in the winding 43 which are fed to the "Read output" 44.

The circuit illustrated may form one stage of a parallel binary adder. A single addition may involve the successive application of three pulses each representing a unit digit of the appropriate binary order, and while the order of application of such pulses is immaterial to the operation of the circuit, it will be assumed that incoming pulses occur in the order addend, augend and carry. Of course if all these quantities are zero, no pulse is applied at the corresponding time. The pulses are applied from either of the sources 1 or 2 depending upon their significances. Moreover input pulses are always timed to occur in synchronism with shift pulses. To distinguish the input pulses from the shift pulses, the input pulses may be termed operative for information pulses. As an operative pulse does not occur when the corresponding quantity is zero, a shift pulse may occur without the simultaneous occurrence of an operative pulse but not vice versa. At the start of an addition, all the cores may be assumed to be in the first remanent state. The first operative pulse, from the source 1 or 2, passes through the appropriate diode 3 or 4 to charge the condenser 5 thus causing the transistor 8 to conduct heavily. This arrangement is described in U.S. Patent No. 3,171,101 to Godfrey Newbold Hounsfield dated February 23, 1965, and entitled, "Pulse Transfer Devices," and for present purposes it is sufficient to indicate that the conduction of the transistor 8 in response to an operative pulse is prolonged beyond the corresponding shift pulse, so that operation of the circuit is not prevented by reason of the shift pulses. The output current of the transistor 8 flowing through the winding 11 tends to drive the core 14 to the first remanent state and therefore has no effect as it is already in that state. The same output current through the winding 12 tends to drive the core 15 to the second remanent state, which it does, after the corresponding shift pulse ends. The consequent output pulse induced in the winding 27 is blocked by the diode 28 and therefore prevented from producing any input signal to the transistor 30. The output current of the transistor 8 in the winding 13 produces a half strength drive to the core 16 but has no effect in the absence of a second half strength drive to the core 16 by way of the winding 35 which is in the output circuit of the transistor 30. By the operation so far described it is obvious that the addend, if it has value 1, sets the core 15 in the second remanent state, thereby entering the addend into the adder. The core 15 may be regarded as an entry core.

If the augend is zero, the next shift pulse to occur is not accompanied by an operative pulse. Such a shift pulse through the winding 20 drives the core 15 back to the first remanent state inducing an output pulse in the winding 27 which is of such polarity that the diode 28 is rendered conducting and the condenser 26 is negatively charged. The output pulse is prolonged beyond the shift pulse by the action of the condenser 26 and the resistor 29. The transistor 30 conducts heavily in response to this prolonged pulse and the output current of the transistor flows through the windings 33, 34, 35 and 36. The current through the winding 33 drives the core 14 to the second remanent state after the shift pulse ends. The same output current flowing in the winding 34 tends to switch the core 15 to the first remanent state but as the core is already in this state, no change occurs. Therefore as a result of the shift pulses the states of the cores 14 and 15 are interchanged, the sum of the addend and the augend being in fact stored in the core 14. The output current of the transistor 30 also flows in the windings 35 and 36 producing half strength drive at the cores 16 and 23. However as there is no operative pulse, there is no half strength drive on the core 16 by way of the winding 13 and consequently no output appears at 40. The half strength drive on the core 23 from the winding 36 produces no output at 44 unless another half strength drive is applied from the source 41 via the winding 42. A half strength drive from the source 41 is applied when desired to sense the result of an addition.

If the augend is 1, the operation of the circuit differs from that described in the preceding paragraph by reason of the fact that the transistor 8 is caused to conduct for a period which is longer than that of the corresponding shift pulse. The current from the transistor 8 in the winding 11 then counteracts the current in the winding 33 from the transistor 30 and prevents the core 14 from being changed to the second remanent state. The core 14 therefore remains in the first remanent state indicating a total zero. The current from the transistor 8 and in the winding 12 has no effect on the core 15 since it is counteracted by the current in the winding 34 from the transistor 30. However the current from the transistor 8 and the winding 13 produces a second half strength drive on the core 16 causing an output to appear at 40 representing a carry, which can be transferred in any suitable way to the subsequent stage of the adder.

If the carry to the stage shown is zero, the state of the circuit is unaltered by the next shift pulse. For example, if the core 14 is in state 1 after the augend has been received, the next shift pulse, coming at the carry time, restores the core 14 initially to the first remanent state by way of the winding 19. The corresponding output induced in the winding 24 renders the diode 25 conducting, charges the condenser 26 and renders the transistor 30 highly conducting for an interval which is longer than the shift pulse. The ouput current from the transistor 30 therefore restores the core 14 to a second remanent state when the shift pulses end. However it has no effect on the cores 15 and 16 and effects the cores 23 only if there is a take out drive from the source 21.

On the other hand if the carry is 1 there is an operative pulse at the same time as the last mentioned shift pulse. This operative pulse prolonged by the components 5 and 6 and amplified by the transistor 8 counteracts the tendency for the transistor 30 to restore the core 14 to the second remanent state. The core 14 is therefore left in the first remanent state to which it is switched by the shift pulse. The state of the core 15 is not changed. However a second half strength drive is providing at the core 15, producing in conjunction with the output current of transistor 30, and output 40 representing a carry.

A carry may therefore occur at either the second step or the third step of the process described. As the result of successive additions is accumulated in the core 14, a carry can also occur at the first step of an addition process if 1 is stored in the circuit and the addition of a subsequent addend is 1. Suitable means may be provided for storing the carry signals from the circuit shown and feeding them at selected times to the next state of the parallel binary adder. The result accumulated on the switch may also be read at any desired time from the take out signal from the source 41, such a signal being of course co-incident with a shift pulse. The pulses from 41 are at least as long as the pulses from 30.

A circuit basically of the same construction as that illustrated in FIGURE 1 may be used as a divide-by-two circuit since it will be understood that by suitably timing operative pulses in relation to shift pulses, one output pulse can be obtained for alternate operative pulses.

Referring to FIGURE 2, which illustrates two stages of a counter circuit according to the invention which in operation "counts down" from a number stored in the circuit. The input number in parallel binary coded form enters the apparatus at 51 and 52, with the digit of greatest significance on the right, that is at 52. Operative or count pulses at 53 reduce the stored number by one unit per pulse. Pulses to subsequent stages leave the apparatus at 54. For operation of this circuit, shift pulses are arranged to occur at twice the frequency of the operative pulses.

An input number digit pulse at 51 passes through the diode 55 to charge the condenser 56, which is shunted by resistor 57. The lower end of the condenser is connected to a source 58 of bias voltage for the transistor 59. The upper end of the condenser is connected via resistor 60 to the base electrode of the transistor. The emitter electrode is connected by way of resistor 61 to earth or some other point of reference potential. The output current of the transistor flows through winding 62, associated with magnetic core 63, winding 64 associated with magnetic core 65, and resistor 66. The resistor 66 is connected between one end of winding 64 and source 67 of polarising potential for the transistor. An operative pulse from 53 is applied to winding 68 associated with magnetic core 63 and winding 69 associated with magnetic core 65. Also coupled ot magnetic core 63 is the winding 70 which is connected via diode 71 across the condenser 56. Shift pulses are applied to windings 72 and 73 coupled to magnetic cores 63 and 65 respectively driving them to a first remanent state. A further winding 74 is coupled to magnetic core 65 and is connected via diode 75 across condenser 76. Resistor 77 is shunted across condenser 76. One end of condenser 76 is connected to bias source 58, and the other end via resistor 78 to the base electrode of transistor 76. The emitter electrode of transistor 79 is connected via resistor 80 to earth or other point of fixed potential. Windings 81 and 82 associated with magnetic cores 83 and 84 respectively, are connected in series between the collector electrode of transistor 79 and the collector electrode of transistor 59.

Associated with the magnetic cores 83 and 84 is an exactly simlar arrangement of components as that associated with cores 63 and 65 except that the pulses to subsequent stages at 54 are taken from across the collector electrodes of the two transistors.

Assume that the input number is 3 or in binary code 11 then there is an input number digit pulse at both 51 and 52. The pulse at 51 passes through the diode 55 and charges up the condenser 56, causing the transistor 59 to conduct heavily. The output current of the transistor determined by the resistor 66 flows through the winding 62 setting the core 63 to the second remanent state and through the winding 64 inhibiting the change of the core 65 from the first remanent state to the second. In a similar way the pulse at 52 sets the core 83 to the second remanent state and inhibits a change to the second remanent state of the core 84. The pulses at 51 and 52 coincide with a shift pulse but the final setting of the cores is not effected by the shift pulse, since the input pulses are "stretched," for example by the components 71, 56 and 57 beyond the shift pulse.

A shift pulse now resets the cores 63 and 83 to the first remanent state causing an output pulse on the associated windings and a similar cycle of events to that described above with the consequent resetting to the second remanent state of the cores 63 and 83 and the accompanying inhibition of the cores 65 and 84. Thus the shift pulse at this stage is without effect.

An operative pulse at 53 through the windings 68 and 69 inhibits a change from the first remanent state to the second of the core 63, and tends to drive the core 65 to the second remanent state. The operative pulses have the same duration as the current pulses in the output of the transistor 59, so that there will be current flowing through the windings 62 and 64 with the tendencies described above with the result that both of the cores 63 and 65 remain in the first remanent state. Thus one unit has been subtracted from the stored number.

Another shift pulse now occurs without effect, followed by a second operative pulse at 53. The latter is now able to set the core 65 to the second remanent state, but will have no effect on the core 63. The pulses at 53 are longer than the shift pulses but begin simultaneously with them and therefore are able to change the state of a core after the end of a shift pulse. A further shift pulse now resets the core 65 to the first remanent state inducing an output pulse in the winding 74 which passes through the diode 75 to charge the condenser 76. In a similar way to the circuit arrangement coupled to the core 63, the transistor 79 conducts and an output current flows through the windings 62, 64, 81 and 82. The effect of this current through windings 81 and 82 is similar to that of input pulses through windings 68 and 69 on the associated cores, and therefore both of the cores 83 and 84 are left in the first remanent state. The current through the windings 62 and 64 has the same effect as if it were caused by the transistor 59 and the core 63 is set to the second remanent state. The core 65 in effect acts as a temporary store for holding an operative pulse when the core 63 is in the first remanent state, until it is transferred to the next stage of the circuit by the next shift pulse to occur.

Thus the number stored is reduced by two units.

A third operative pulse subtracts a third unit from the number stored leaving the counter with zero stored in it. The zero state may be detected by using pulses circulating in the upper loop of any stage to inhibit a warning pulse output so that when uninhibited the warning pulse is emitted and the zero state detected.

Although the invention has been described as it would be applied to two specific embodiments it is not limited to them and many other applications of the invention will be formed by those skilled in the art.

The circuit shown in FIGURE 2 can also, with some modifications, be arranged to operate as a parallel subtractor. In this case, the diminuend is applied at 51 and 52 and the corresponding points in the other stages, and the individual digits of the subtrahend are applied respectively to the corresponding stages. Other applications of the basic circuit of the invention may also be formed by those skilled in the art.

What I claim is:

1. A device comprising first and second two-state devices, a source of information pulses, a source of shift pulses, means responsive to said shift pulses to set said two-state devices to a first stable state, means responsive to said information pulses to tend to set said first two-state device to the second stable state, means including a delay device responsive to a change of state of either of said two-state devices from said second to said first stable state to tend to set after a delay said second two-state device to the second stable state and to inhibit the change to said second stable state of said first two-state device, and means responsive to said information pulses to inhibit the change to said second stable state of said second two-state device.

2. A device according to claim 1, said first and second two-state devices comprising first and second magnetisable cores respectively.

3. A device according to claim 1 said means responsive to said information pulses comprising a source of information pulses which begin synchronously with said shift pulses and including means for prolonging said information pulses.

4. A device according to claim 3 said means responsive to a change of state of either of said two-state devices from said second to said first stable state including means for deriving an impulse signal from the device when the change of state from said second to said first stable state occurs and said delay device being arranged to prolong said impulse signal to the same extent as the respective information pulse.

5. A device according to claim 5 adapted for binary accumulation comprising means for deriving output pulses in response to the changes of state of either of said two-state devices from said second to said first stable state, and means for deriving a carry signal in response to the simultaneous occurrence of an information pulse and an output pulse.

6. A device according to claim 1 adapted for counting down or subtracting in binary scale, comprising means for initially setting said second device to its second stable state, and means for deriving an output signal representing a subtrahend of higher digital order in response to a change of state of said first device to its first stable state.

References Cited by the Examiner

UNITED STATES PATENTS

| | | | |
|---|---|---|---|
| 2,781,504 | 2/1957 | Canepa | 307—88 |
| 2,801,344 | 7/1957 | Lubkin | 307—88 |
| 2,803,812 | 8/1957 | Rajchman et al. | 340—174 |
| 2,805,020 | 9/1957 | Lanning | 235—176 |
| 2,806,648 | 9/1957 | Rutledge | 235—176 |
| 2,898,579 | 8/1959 | Moore | 340—174 |
| 2,902,609 | 9/1959 | Ostroff | 340—174 |
| 3,030,611 | 4/1962 | Pike | 340—174 |

OTHER REFERENCES

Pages 859–869, Oct. 3–5, 1955, Van Nice et al., A Predetermined Scaler Utilizing Transistors and Magnetic Cores, Proceeding of the National Electronics Conference, vol. XI, Chicago, Ill.

IRVING L. SRAGOW, *Primary Examiner.*

LEO SMILOW, EVERETT R. REYNOLDS, *Examiners.*